ns Patent [19]

Elser et al.

[11] 3,925,427
[45] Dec. 9, 1975

[54] MANUFACTURE OF ANTHRAQUINONOID DISPERSE DYES CONTAINING BROMINE

[75] Inventors: Wolfgang Elser; Heinz Eilingsfeld, both of Frankenthal; Werner Schoch, Eschelbronn, all of Germany

[73] Assignee: BASF Aktiengesellschaft, Ludwigshafen (Rhine), Germany

[22] Filed: July 8, 1974

[21] Appl. No.: 486,418

[30] Foreign Application Priority Data
July 7, 1973  Germany.......................... 2334657

[52] U.S. Cl............................ 260/380; 260/380 X
[51] Int. Cl.² ..................... C07C 97/26; C09B 1/50
[58] Field of Search .................................. 260/380

[56] References Cited
UNITED STATES PATENTS

| | | | |
|---|---|---|---|
| 2,604,480 | 7/1952 | Seymour et al..................... | 260/380 |
| 2,990,413 | 6/1961 | Gehrke ............................. | 260/380 |
| 3,033,880 | 5/1962 | Buecheler........................ | 260/380 X |
| 3,147,284 | 9/1964 | Rhyner ........................... | 260/380 X |
| 3,164,615 | 1/1965 | Buecheler........................ | 260/380 X |
| 3,714,205 | 1/1973 | Moergeli........................... | 260/380 |

*Primary Examiner*—Paul F. Shaver
*Attorney, Agent, or Firm*—Johnston, Keil, Thompson & Shurtleff

[57] ABSTRACT

A process for the manufacture of blue anthraquinonoid disperse dyes based on 1,5(1,8)-diamino-4,8(4,5)-dihydroxyanthraquinone, wherein 1,5(1,8)-dinitro-4,8(4,5)-dimethoxy-anthraquinone or mixtures of these compounds are reduced, in 20 to 45% strength by weight oleum, with sulfur at −10° to +50°C in the presence of boric acid, and the product of the reduction is brominated in sulfuric acid or 0 to 5% strength by weight oleum or in organic solvents until the product thus obtained contains 12 to 30% by weight of bromine. Dyes which give deep and, in particular, light-fast dyeings, above all on fibrous materials consisting of linear polyesters, are obtained.

10 Claims, No Drawings

MANUFACTURE OF ANTHRAQUINONOID DISPERSE DYES CONTAINING BROMINE

The invention relates to a process for the manufacture of anthraquinonoid disperse dyes, containing bromine, of the 1,5-diaminoanthraquinone and/or 1,8-diamino-anthraquinone series.

It is an object of the present invention to provide a simple and economical process for the manufacture of blue, light-fast anthraquinonoid disperse dyes.

We have found that light-fast, blue anthraquinonoid disperse dyes are obtained by reduction of 1,5-dinitro-4,8-dimethoxy-anthraquinone, 1,8-dinitro-4,5-dimethoxy-anthraquinone or mixtures thereof and bromination of the reduction products, if the reduction of the dinitro-dimethoxy-anthraquinone is carried out with not less than the stoichiometric amount of sulfur in 20 to 45 percent strength by weight oleum in the presence of boric at temperatures from −10° to 50°C.

The dyes obtained in accordance with the process of the invention give greenish blue, light-fast dyeings on synthetic fibers, especially on linear polyester fibers. Dyeing with these dyes can also be carried out with the assistance of carriers.

A suitable embodiment of the process of the invention is to dissolve 1,5-dimethoxy-4,8-dinitro-anthraquinone, 1,8-dimethoxy-4,5-dinitro-anthraquinone or mixtures thereof in oleum at temperatures from −5° to 25°C, then adding the requisite amount of boric acid to the solution whilst stirring well, and thereafter adding the sulfur reducing agent, if necessary after bringing the solution to the desired temperature.

As a rule, the sulfur trioxide content in the reaction mixture is from 20 to 45, and preferably from 25 to 35, percent by weight, based on oleum. The amount of oleum can vary within wide limits. It is necessary to be able to stir the reaction mixture before, during and after the reaction. An amount by weight of oleum which is 5 to 10 times the amount by weight of dinitro-dimethoxy-anthraquinone is advantageous. The amount of boric acid is in general from 1 to 10, and preferably from 2 to 5, percent by weight, based on dimethoxydinitroanthraquinone. After the boric acid has dissolved in the oleum, the sulfur is added whilst stirring. The amount of sulfur is as a rule from 2.0 to 6.5, and preferably from 2.2 to 3.5, gram atoms per mole of dimethoxy-dinitro-anthraquinone.

It is advantageous to use pulverulent or ground sulfur, to achieve a smooth and rapid reduction. The use of more than 6.5 gram atoms of sulfur per mole of the dimethoxy-dinitroanthraquinone is not detrimental but offers no advantages. As a rule, the reduction is carried out at temperatures from −10° to 50°C but it can also be carried out at temperatures below −10°C if the reaction mixture is fluid at such temperatures. Temperatures from 0° to 25°C are preferred in order to achieve a high space-time yield in the reduction. Under these conditions, the reduction is as a rule complete after from 2 to 5 hours.

To isolate the reduction product, sufficient water may be, as a first step, added cautiously to the reduction mixture to produce a solution of the reduction product in an acid lying in the range from 96 percent strength by weight sulfuric acid to 5 percent strength by weight oleum. During the addition of the water, the temperature should preferably not rise above 25°C. However, a brief rise in the temperature to 30°C has little influence on the yield and quality of the reduction product. The reduction product can be precipitated from the solution, thus obtained, in an acid lying in the range from 96 percent strength by weight sulfuric acid to 5 percent strength by weight oleum, by introducing this solution into a large excess of water or, preferably, by pouring it out onto a mixture of ice and water, and can be isolated by filtration. It is advantageous to have some sodium bisulfite present in the precipitating solution.

The isolated reduction product, which substantially consists of 1,5(1,8)-diamino-4,8(4,5)-dihydroxy-anthraquinone or a mixture of these compounds, is preferably dissolved in a 5-fold to 10-fold amount by weight of sulfuric acid of from 96 to 100 percent by weight strength and is brominated optionally after addition of a halogenation catalyst, such as iron-III sulfate, antimony pentachloride or, preferably, iodine and/or sulfur. The amount of catalyst is in general from 0.5 to 2 percent by weight, based on the reduction product employed. The bromination can also be carried out in the presence of boric acid.

The amount of bromine used depends on the desired bromine content of the dye. As a rule, from 0.25 to 0.9 mole of bromine is employed per mole of reduction product (dihydroxy-diaminoanthraquinone). Bromination products which contain from 12 to 30% by weight, and above all those which contain from 14 to 25% by weight, of bromine are preferred for tinctorial reasons, such as high fastness to light and high fastness to thermofixing. The bromination is carried out at from room temperature to 135°C, and preferably at from 110° to 125°C. A variant of the bromination wherein the requisite amount of bromine is added to the solution of the reduction product at from room temperature to 80°C and the reaction mixture is then slowly heated to from 100° to 135°C, preferably from 110° to 125°C, is particularly preferred. At these temperatures, the bromination is as a rule complete after from 1.5 to 3 hours.

The bromination can also be carried out with excess bromine and can be discontinued, on reaching the desired bromine content in the reaction product, by pouring the reaction mixture into an ice/water mixture or into water. The time at which the reaction should be discontinued can be ascertained, for example, by determining the bromine content in a worked-up sample.

The bromination of the reduction product can also be effected under the abovementioned conditions in the solution, in an acid within the range from 96 percent strength by weight sulfuric acid to 5 percent strength by weight oleum, obtained by cautious dilution of the reduction mixture. This means that the reduction and bromination can be carried out in the same vessel, without isolating the reduction product, and the costs entailed by isolation, working up and drying of the reduction product can thus be saved.

If the bromination of the reduction product is carried out in a reduction mixture which has been diluted cautiously, a slight excess of the sulfur used in the reduction reaction can serve as the halogenation catalyst. However, it is also possible to add the abovementioned catalysts to the solution. The amount of catalyst is from 0.5 to 2 percent by weight, based on dimethoxy-dinitroanthraquinone. If it is intended to carry out the bromination in the cautiously diluted reduction mixture, it is advantageous to avoid a large excess of sulfur in a reduction reaction and therefore preferable to use from 2.2 to 3.5 gram atoms of sulfur per mole of dimethoxy-dinitroanthraquinone.

The dye is then precipitated from the reaction mixture by conventional methods of introducing the mixture into a large amount of water of ice/water mixture, and is isolated from the acid suspension.

The brilliance of the dyes obtained by bromination in sulfuric acid can be improved still further by stirring the moist dye which has been isolated, with an aqueous solution of an alkaline reagent, such as potassium carbonate, sodium carbonate, sodium hydroxide, potassium hydroxide or sodium sulfide, at room temperature. The concentration of the alkaline reagent depends on the base strength of the alkaline reagent and is suitably from 1 to 10 percent by weight, based on the solution. In general, a 5-fold to 20-fold amount by weight of solution, based on the weight of dye, is employed for treating the latter.

The bromination can also be carried out in organic solvents which are 110° under the conditions of the bromination. For this purpose, the dried reduction product is suspended or dissolved in inert solvents, such as chlorobenzene, dichlorobenzene, trichlorobenzene or nitrobenzene, and is brominated after addition of the halogenation catalyst, such as iodine or sulfur. Here again, the amount of halogenation catalyst is from 0.5 to 2 percent by weight, based on the diamino-dihydroxy-anthraquinone (reduction product). As in the case of the bromination in sulfuric acid, the amount of bromine to be used depends on the desired bromine content of the dye. Here again, in general from 0.25 to 0.9 mole of bromine should be employed per mole of diamino-dihydroxy-anthraquinone (reduction product). Advantageous bromination temperatures are from room temperature to 135°C and preferably from 110 to 125°C. The following variant of the bromination is particularly preferred: The bromine is added to the solution or suspension of the reduction product at from room temperature to 80°C, and the reaction mixture is then slowly heated to from 100° to 135°C, preferably to from 110° to 125°C. In general, the reaction is complete after from 1.5 to 3 hours. The dye is precipitated from the reaction mixture by dilution with solvents in which the dye is sparingly soluble or insoluble, such as methanol or ethanol, and is separated off.

Bromination in organic solvents gives dyes which produce more brilliant dyeings on linear polyester fibers than do dyes which have been obtained by bromination in sulfuric acid.

A particularly economical embodiment of the process of the invention is to start from 1,5-dimethoxyanthraquinone, 1,8-dimethoxyanthraquinone or mixtures of these compounds and to carry out the nitration, reduction and bromination as a single-vessel process. For this purpose, the nitration of 1,5-(1,8)-dimethoxy-anthraquinone or of a mixture of these compounds is first carried out in from 85 to 100 percent strength by weight, and preferably from 85 to 96 percent strength by weight, sulfuric acid, in general employing from 1.0 to 1.2 times the stoichiometric amount of nitric acid. During the addition of the nitric acid, the mixture is kept at temperatures from 0° to 15°C and after the addition the reaction mixture is heated to from 60° to 70°C. After completion of the nitration, high strength oleum is added to the reaction mixture to adjust the latter to a sulfur trioxide content of from 20 to 45, and preferably from 25 to 35, percent by weight of $SO_3$. During this addition the temperature must not exceed 25°C. Boric acid, followed by sulfur, is then added to the resulting solution of dimethoxy-dinitro-anthraquinone in oleum. The reduction and bromination are carried out in accordance with the above data.

The process of the invention gives light-fast blue anthraquinonoid disperse dyes which can be used in dyeing with the assistance of carriers. This result was not foreseeable since it is known from the literature (Berichte der Deutschen Chemischen Gesellschaft 29 (1896), page 2939) that the reduction of 1,5-dinitroanthraquinone in oleum and sulfur (sulfur sesquinoxide) gives the corresponding hydroxylated anthraquinone compounds, which in the case of 1,5-diaminoanthraquinone change into the tetrahydroxy-anthraquinones under the reaction conditions.

The Examples which follow are intended to explain the process of the invention in more detail. The parts and percentages specified are by weight.

EXAMPLE 1

17.9 parts of a mixture containing approx. 90% of 1,5-dinitro-4,8-dimethoxy-anthraquinone and 1,8-dinitro-4,5-dimethoxy-anthraquinone and a total of approx. 10% of 1,6-, 2,6- and 2,7-dinitro-anthraquinone, are dissolved in 143 parts of 30% strength oleum at from 0° to 15°C. 6.5 parts of boric acid are introduced in portions into this solution and the mixture is stirred for a further ½ hour. 4 parts of sulfur are introduced at 20°C, and the whole is stirred for 2.5 hours at from 20° to 25°C; 8 parts of water are then added dropwise at the same temperature. After adding 0.2 part of iodine, 3.2 parts of bromine are added dropwise at room temperature and the mixture is heated at from 120° to 125°C for 2.5 hours. After cooling, the reaction mixture is poured out into water containing sodium bisulfite. The precipitate is filtered off, washed until neutral and dried.

Yield: 15.0 parts of a blue dye containing 14.3% of bromine. The dye dyes polyester fibers in blue shades of good fastness properties.

EXAMPLE 2

2.7 parts of a mixture of 1,5- and 1,8-dimethoxyanthraquinone are dissolved in 8 parts of 96% strength sulfuric acid at from 0° to 15°C. 2.7 parts of a 1:1 mixture of nitric acid (100% strength) and sulfuric acid (100% strength) are added dropwise to the preceding solution at from 10° to 15°C (giving a ratio of 1:1 parts). The reaction mixture is then heated at 25°C for ½ hour, 40°C for ½ hour and 60°C for 5 hours. 18.6 parts of 65% strength oleum are then added to the reaction mixture at a temperature not exceeding 20°C. 1.3 parts of boric acid are then introduced in poritions and the mixture is stirred for a further ½ hour. 0.8 part of sulfur is introduced at 20°C and the whole is stirred for a further 2.5 hours at from 20° to 25°C. 1.6 parts of water are then added dropwise whilst keeping the temperature below 20°C. After adding 0.04 part of iodine, 0.7 part of bromine is added dropwise at 20°C and the bromination mixture is heated at from 120° to 125°C for 3 hours. After cooling, the mixture is poured into water containing sodium bisulfite and the precipitate is filtered off, washed until neutral and dried.

Yield: 3.3 parts of a blue dye containing 15% of bromine. This product dyes polyester fibers in blue shades having good fastness properties.

EXAMPLE 3

The procedure of Example 2 is followed but the 10 parts of 96% strength sulfuric acid are replaced by 8 parts and the 18.6 parts of 65% strength oleum are replaced by 21 parts. 1.8 parts of water, instead of 1.6 parts, are used to dilute the reaction mixture. 3.3 parts of a blue disperse dye containing 14.5% of bromine are obtained.

EXAMPLE 4

2.7 parts of a mixture of 1,5- and 1,8-dimethoxy-anthraquinone are dissolved in 10 parts of 85% strength sulfuric acid at from 0° to 15°C. 2.7 parts of a 1:1 mixture of nitric acid (100% strength) and sulfuric acid (100% strength) are added dropwise to the preceding solution at from 10° to 15°C. The reaction mixture is then heated at 25°C for ½ hour, 35°C for ½ hour, 45°C for 1 hour and 60°C for ½ hour, and is then cooled. At 20°C, 35.8 parts of 65% strength oleum are added to the nitration mixture. 1.3 parts of boric acid are then introduced in portions and the mixture is stirred for ½ hour. 0.8 part of sulfur is introduced into the mixture thus obtained, at 20°C, and the whole is stirred for 2.5 hours at from 20° to 25°C. 3.2 parts of water are added dropwise to this reaction mixture whilst keeping the temperature below 20°C. The sulfuric acid solution is then poured out into water to which technical grade bisulfite solution has been added. The precipitate is filtered off, washed until neutral and dried.

Yield: 2.34 parts of a blue powder which consists substantially of a 1,5-(1,8)-diamino-4,8-(4,5)-dimethoxy-anthraquinone mixture.

2.7 parts of the blue powder thus obtained are dissolved in 10 ml of nitrobenzene. 0.04 part of iodine is added, followed by 1.1 parts of bromine added dropwise in the course of 1 hour at from 70° to 80°C, and the mixture is then heated at from 120° to 125°C for 2 hours. After cooling, the reaction mixture is diluted with 8 ml of methanol and the precipitate is isolated and dried.

Yield: 2.7 parts of a blue dye containing 15.4% of bromine. This product dyes polyester fibers in brilliant shades having good fastness properties.

EXAMPLE 5

26.8 parts of 1,5-(1,8)-dimethoxy-anthraquinone are dissolved in 100 parts of 85% strength sulfuric acid at from 10° to 15°C. 26 parts of a 1:1 mixture of nitric acid (100% strength) and sulfuric acid (100% strength) are added dropwise to this solution at from 10 to 15°C. The reaction mixture is then heated for ½ hour at 25°C, ½ hour at 35°C and ½ hour at 45°C, and is then cooled. 281 parts of 65% strength oleum are added to the nitration mixture at from 10° to 15°C. 13 parts of boric acid are then introduced at the same temperature and the mixture is stirred for ½ hour. 8 parts of powdered sulfur are introduced into the resulting solution at from 15° to 20°C and the whole is stirred for 2.5 hours at from 15° to 20°C. 22.3 parts of water are then added dropwise to this reaction mixture at from 10° to 15°C. After adding 0.4 part of iodine, 10 parts of bromine are added at room temperature and the mixture is heated for ½ hour at 30°C, ½ hour at 50°C, ½ hour at 80°C, ½ hour at 100°C and 2 hours at from 120° to 125°C. After cooling, the reaction mixture is poured out into 1,600 parts of water containing 25 parts of sodium bisulfite. The precipitate is filtered off, washed until neutral and dried.

Yield: 34 parts of a blue dye containing 21.6% of bromine. The dye dyes polyester fibers in brilliant shades having good fastness properties.

EXAMPLE 6

The procedure of Example 5 is followed, except that the reduction is carried out at 30°C.

Yield: 32.6 parts of a blue dye containing 21.2% of bromine.

EXAMPLE 7

The procedure of Example 5 is followed, except that the reduction is carried out at from 40° to 45°C.

Yield: 31.2 parts of a blue dye containing 20% of bromine.

EXAMPLE 8

The procedure of Example 5 is followed, except that the reduction is carried out at 50°C.

Yield: 32 parts of a blue dye containing 21.7% of bromine.

EXAMPLE 9

The procedure of Example 5 is followed, except that the reduction is carried out at 0°C. Duration: 5 hours.

Yield: 34 parts of a blue dye containing 22.9% of bromine.

EXAMPLE 10

The procedure of Example 5 is followed, except that instead of 8 parts of sulfur, 10 parts of sulfur are used as the reducing agent, and instead of 10 parts of bromine, 11 parts of bromine are used for the bromination.

Yield: 32.8 parts of a blue dye containing 20.4% of bromine.

EXAMPLE 11

The procedure of Example 5 is followed, except that the reduction is carried out with 15 parts of sulfur and, instead of 10 parts of bromine, 11 parts of bromine are used.

Yield: 34.5 parts of a blue dye containing 15.3% of bromine.

EXAMPLE 12

26.8 parts of a mixture of 1,5- and 1,8-dimethoxyanthraquinone are dissolved in 100 parts of 85% strength sulfuric acid at from 10° to 15°C. 26 parts of a 1:1 mixture of nitric acid (100% strength) and sulfuric acid (100% strength) are added dropwise to this solution at from 10° to 15°C. The reaction mixture is then heated at 25°C for 1 hour, after which it is cooled. 281 parts of 65% strength oleum are added to the nitration mixture at from 10° to 15°C; temperature: 10° to 15°C. 13 parts of boric acid are then introduced and the mixture is stirred for ½ hour at from 10° to 15°C. 8 parts of sulfur are added to the resulting solution at from 15° to 20°C and the reaction mixture is stirred for 2.5 hours at from 15° to 20°C. 22.3 parts of water are then added dropwise at from 10° to 15°C. After adding 0.4 part of iodine, 1 part of $SOCl_2$ is added at from 10° to 15°C and the mixture is stirred for 10 minutes. 8 parts of bromine are then added and the mixture is heated for 30 minutes at 30°C, 30 minutes at 50°C, 30 minutes at 80°C, 30 minutes at 100°C and then 2 hours at from 120° to 125°C. After cooling, the reaction mixture is poured out into 1,600 parts of water containing 25 parts of sodium bisulfite. The precipitate is filtered off, washed until neutral and dried.

Yield: 33.3 parts of a blue dye containing 2.4% of chlorine and 15.2% of bromine. The dye dyes polyester fibers in brilliant shades having good fastness properties, and exhibits good carrier affinity.

EXAMPLE 13

The procedure of Example 5 is followed. 100 parts of the press cake which is wet with water (corresponding to 20 parts of dried bromination product) are stirred into 100 parts of water, 0.3 part of technical sodium sulfide is added and the mixture is stirred for 5 hours at room temperature. The suspension is then added to 1,000 parts of hot water and the precipitate is filtered off and washed until neutral.

Yield: 17.6 parts of a blue dye containing 21.7% of bromine. This product gives a more brilliant blue dyeing on polyester than that obtained with the dye according to Example 5.

EXAMPLE 14

26.8 parts of a mixture of 1,5- and 1,8-dimethoxyanthraquinone are dissolved in 100 parts of 85% strength sulfuric acid at from 30° to 35°C. 27 parts of nitration acid (52% of 100% strength nitric acid and 48% of 100% strength sulfuric acid) are added dropwise to this solution at from 10° to 15°C. The reaction mixture is stirred for a further hour, heated at 25°C for 1 hour and then cooled. At 10 to 15°C, 282 parts of 65% strength oleum are added to the nitration mixture. 13 parts of boric acid are then introduced at from 10° to 15°C and the mixture is stirred for half an hour at from 15° to 20°C. 8 parts of sulfur are introduced into the resulting solution at from 15° to 20°C and this reaction mixture is stirred for 1½ hours at from 20° to 25°C; 17.97 parts of water are then added dropwise at from 10° to 15°C. After adding 0.4 part of iodine, 2 parts of SOCl$_2$ are added at from 20° to 25°C and the mixture is stirred for 20 minutes. 8 parts of bromine are then added and the mixture is heated for 30 minutes at 30°C, 30 minutes at 50°C, 30 minutes at 80°C, 1 hour at 100°C and 2½ hours at from 120° to 125°C. After cooling, the reaction mixture is poured out into 989.73 parts of water. The precipitate is filtered off, washed until neutral and dried.

Yield: 33 parts of a blue dye containing 4% of chlorine and 13% of bromine. The dye dyes polyester fibers in brilliant shades having good fastness properties.

EXAMPLE 15

The procedure of Example 14 is followed, but using 16 parts of bromine.

Yield: 36.3 parts of a blue dye containing 28.3% of bromine.

EXAMPLE 16

The procedure of Example 14 is followed, but using 20 parts of bromine.

Yield: 38.3 parts of a blue dye containing 31.4% of bromine.

EXAMPLE 17

The procedure of Example 14 is followed, but using 25 parts of bromine.

Yield: 39.6 parts of a blue dye containing 34.7% of bromine.

We claim:

1. In a process for the preparation of blue anthraquinonoid disperse dyes containing bromine, wherein 1,5-dinitro-4,8-dimethoxyanthraquinone, 1,8-dinitro-4,5-dimethoxyanthraquinone or mixtures thereof, are reduced and the reaction product is brominated in an acid medium within the range from 96% strength by weight sulfuric acid to 5% strength by weight oleum, or in an organic solvent which is inert under the reaction conditions, at a temperature of from room temperature to 135°C, until the reaction product contains from 12 to 30% by weight of bromine, the improvement which comprises carrying out the reduction of said dinitro-dimethoxyanthranquinones in oleum which contains from 20 to 45% by weight of sulfur trioxide, with not less than the stoichiometrically required amount of sulfur in the presence of boric acid at a temperature of from −10 to +50°C.

2. A process as claimed in claim 1, wherein the reduction of the dinitro compound is carried out in from 25 to 35% strength by weight oleum.

3. A process as claimed in claim 1, wherein the reduction is carried out at a temperature of from 0° to 25°C.

4. A process as claimed in claim 1, wherein 2.0 to 6.5 gram atoms of sulfur are used per mole of dinitroanthraquinone compound.

5. A process as claimed in claim 1, wherein the reduction is carried out in the presence of from 1 to 10% by weight of boric acid, based on dinitro-dimethoxyanthraquinone.

6. A process as claimed in claim 1, wherein the reduction is carried out in the presence of from 2 to 5% by weight of boric acid, based on dinitro-dimethoxyanthraquinone.

7. A process as claimed in claim 1, wherein from 2.2 to 3.5 gram atoms of sulfur are used per mole of dinitro-dimethoxyanthraquinone.

8. A process as claimed in claim 1, wherein the reaction medium used is an amount, by weight, of oleum which is 5 to 10 times the amount by weight of dinitro-dimethoxyanthraquinone.

9. A process as claimed in claim 1, wherein from 0.25 to 0.9 mole of bromine is used, per mole of reduction product, for the bromination of the latter.

10. A process as claimed in claim 1, wherein the bromination is carried out at from 110° to 125°C.

* * * * *